No. 895,473. PATENTED AUG. 11, 1908.
T. KNIGHT.
RAT TRAP.
APPLICATION FILED NOV. 30, 1907.
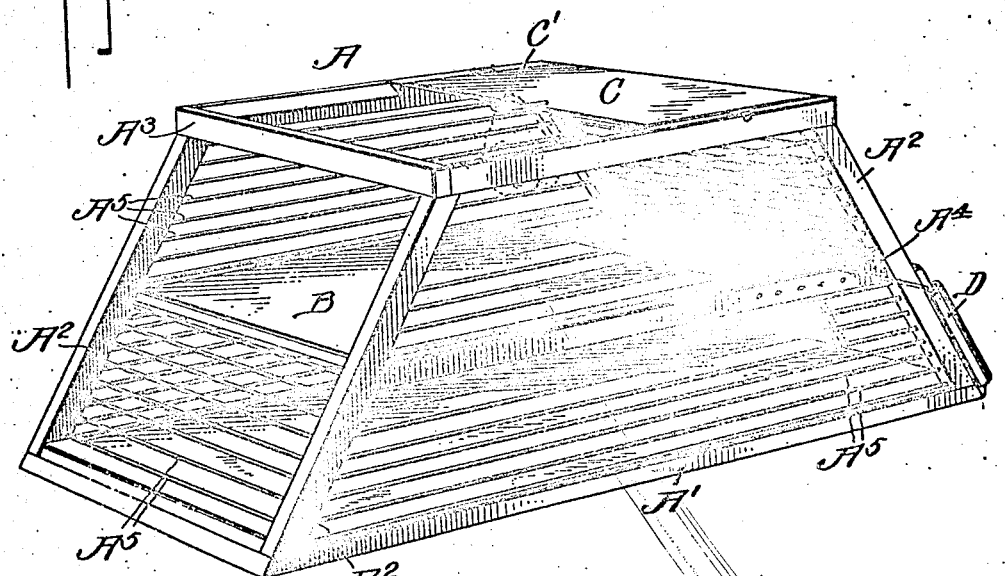
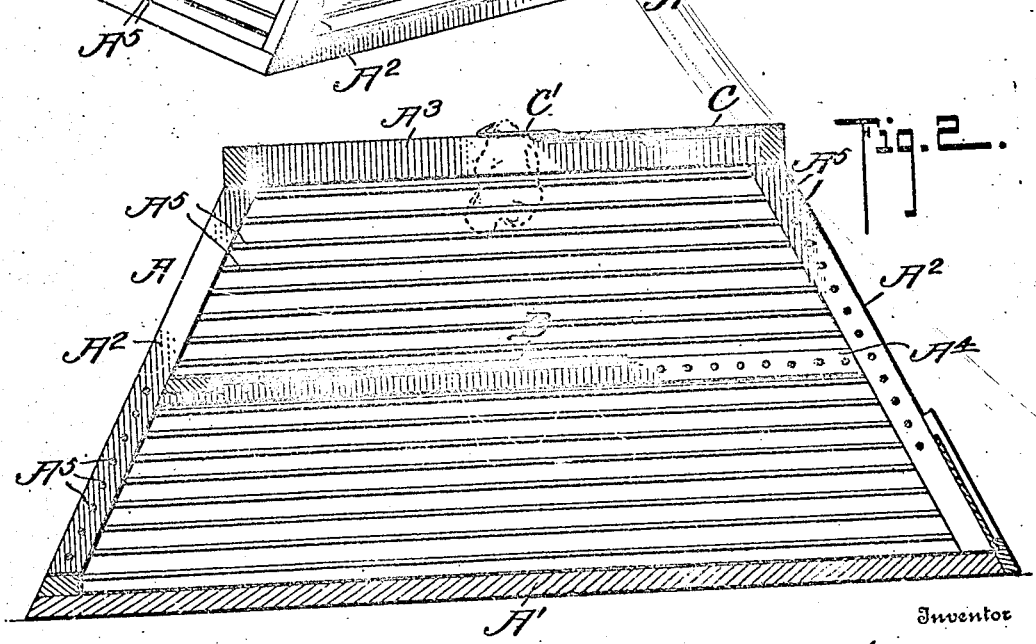

UNITED STATES PATENT OFFICE.

THOMAS KNIGHT, OF ATLANTA, GEORGIA.

RAT-TRAP.

No. 895,473.　　　　Specification of Letters Patent.　　Patented Aug. 11, 1908.

Application filed November 30, 1907.　Serial No. 404,601.

*To all whom it may concern:*

Be it known that I, THOMAS KNIGHT, a citizen of the United States, residing at Atlanta, in the county of Fulton and State of Georgia, have invented a new and useful Improvement in Rat-Traps, of which the following is a specification.

This invention relates to rat traps and more particularly to ever-set traps, the object being to provide a trap by which a number of rats can be caught in the trap at one time with the same bait.

Another object of my invention is to provide a pivoted bait-holder so that the rat will be attracted on to the trap-door as he forces the holder downwardly.

With these objects in view, the invention consists in the novel features of construction, combination and arrangement of parts, hereinafter fully described and pointed out in the claims.

In the drawings forming a part of this specification:—Figure 1 is a perspective view of my improved trap. Fig. 2 is a longitudinal sectional view of the same.

In the drawing A indicates a cage formed of a base A' at the ends of which are secured inclined uprights A², on the upper ends of which is secured a rectangular frame A³.
The uprights A² are connected together by bars A⁴ and by rods A⁵. These rods are spaced a short distance apart and extend upwardly to the frame on three of its sides, leaving an opening at one end, through which the rat enters onto a trap-door B which is pivoted between the side-bars A⁴, the pivot-point being to one side of the longitudinal center, so that when the rat passes over the door it will drop downwardly and deposit the rat into the cage.

The bars A⁴ are connected together by rods at each end leaving an opening at the center through which the trap-door B swings and prevents the rat from getting out when the door is dropped by another one coming in. A plate C is pivotally mounted in the frame A³ at one end and is provided with a hook C' for holding the bait which is so arranged that when the rat tries to reach the same, it will swing downwardly and drop him on to the trap-door where he will slide into the cage. The sliding door D is arranged at one end of the cage for taking the rats out and the bottom of the cage is covered with tin so as to prevent the rats from gnawing out.

From the foregoing description it will be seen that I have provided a very novel trap with a swinging bait-holder arranged over a trap door which will swing downwardly when a rat tries to reach the bait and drop him on to the trap-door.

Having thus fully described my invention, what I claim as new and desire to secure by Letters Patent is:—

A rat trap comprising a base provided with uprights, a top frame supported by the uprights, rods connecting said uprights forming a cage, side-bars connecting said uprights, a trap door mounted in said side-bars, and a plate mounted on said frame adjacent one end provided with a bait holding hook which extends over said door, for the purpose set forth.

THOS. KNIGHT.

Witnesses:
A. P. WOOD,
R. O. BROOKS.